US011713081B2

(12) United States Patent
Gim et al.

(10) Patent No.: US 11,713,081 B2
(45) Date of Patent: Aug. 1, 2023

(54) VEHICLE BODY

(71) Applicants: Hyundai Motor Company, Seoul (KR); Kia Corporation, Seoul (KR)

(72) Inventors: Seok Ju Gim, Seongnam-si (KR); Tae Gyu Park, Hwaseong-si (KR); Ho Yeon Kim, Daegu (KR); Sun Hyung Cho, Suwon-si (KR); Chul Hee Heo, Hwaseong-si (KR); Ji Ae Yong, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 135 days.

(21) Appl. No.: 17/344,244

(22) Filed: Jun. 10, 2021

(65) Prior Publication Data
US 2022/0185376 A1   Jun. 16, 2022

(30) Foreign Application Priority Data

Dec. 10, 2020   (KR) .................. 10-2020-0172442

(51) Int. Cl.
*B62D 21/15* (2006.01)
*B62D 25/02* (2006.01)
*B62D 21/02* (2006.01)
*B62D 27/02* (2006.01)
*B62D 25/20* (2006.01)

(52) U.S. Cl.
CPC ............. *B62D 21/15* (2013.01); *B62D 21/02* (2013.01); *B62D 25/02* (2013.01); *B62D 25/2036* (2013.01); *B62D 27/02* (2013.01)

(58) Field of Classification Search
CPC ........ B62D 21/15; B62D 21/02; B62D 25/02; B62D 25/2036; B62D 27/02
USPC .................................. 296/204, 205, 193.07
See application file for complete search history.

(56) References Cited

U.S. PATENT DOCUMENTS

| 4,108,469 | A | | 8/1978 | Schwarzbich |
| 4,986,597 | A | | 1/1991 | Clausen |
| 5,209,541 | A | * | 5/1993 | Janotik ................. B62D 27/02 29/469 |
| 5,549,352 | A | * | 8/1996 | Janotik ................ B62D 29/008 296/205 |
| 5,692,798 | A | | 12/1997 | Wehner et al. |
| 6,073,992 | A | | 6/2000 | Yamauchi et al. |

(Continued)

FOREIGN PATENT DOCUMENTS

| CN | 19980070976 A | 10/1998 |
| CN | 107054039 A | 8/2017 |

(Continued)

*Primary Examiner* — Amy R Weisberg
*Assistant Examiner* — E Turner Hicks
(74) *Attorney, Agent, or Firm* — Slater Matsil, LLP

(57) ABSTRACT

A vehicle body includes a pair of side truss members extending in a longitudinal direction of a vehicle, a plurality of cross truss members connecting the pair of side truss members to each other in a width direction of the vehicle, a plurality of cross floor truss members coupled to upper ends of the pair of side truss members, extending in a transverse direction of the side truss members, and spaced apart from each other in an anteroposterior direction, and a plurality of side connection truss members extending in the longitudinal direction of the vehicle and connecting ends of the cross floor truss members to each other.

20 Claims, 5 Drawing Sheets

(56) References Cited

U.S. PATENT DOCUMENTS

| | | | |
|---|---|---|---|
| 6,135,498 A | 10/2000 | Vlahovic | |
| 6,282,790 B1 | 9/2001 | Jaekel et al. | |
| 6,334,642 B1 | 1/2002 | Waldeck et al. | |
| 6,824,204 B2 * | 11/2004 | Gabbianelli | B62D 21/152 |
| | | | 296/193.06 |
| 6,948,768 B2 * | 9/2005 | Corcoran | B62D 33/06 |
| | | | 296/205 |
| 7,677,646 B2 * | 3/2010 | Nakamura | B62D 33/06 |
| | | | 296/205 |
| 8,998,216 B2 * | 4/2015 | Maeda | B62D 21/183 |
| | | | 280/5.511 |
| 9,004,499 B2 | 4/2015 | Zeweke et al. | |
| 10,800,224 B2 * | 10/2020 | Sellars | B60G 3/225 |
| 11,505,260 B2 | 11/2022 | Heo et al. | |
| 2010/0194086 A1 | 8/2010 | Yamamura et al. | |
| 2012/0255799 A1 | 10/2012 | Kohler et al. | |
| 2014/0124277 A1 | 5/2014 | Kurakawa et al. | |
| 2014/0144719 A1 | 5/2014 | Morgan et al. | |
| 2014/0224557 A1 | 8/2014 | Wu | |
| 2015/0291056 A1 | 10/2015 | Nozaki | |
| 2015/0343900 A1 | 12/2015 | Schlangen et al. | |
| 2016/0347373 A1 | 12/2016 | An et al. | |
| 2017/0174069 A1 | 6/2017 | Oyama et al. | |
| 2017/0217296 A1 | 8/2017 | Nomura et al. | |
| 2017/0225714 A1 * | 8/2017 | Ito | B60L 53/16 |
| 2017/0225715 A1 | 8/2017 | Kobayashi et al. | |
| 2017/0246942 A1 | 8/2017 | Takaki et al. | |
| 2017/0334278 A1 | 11/2017 | Yamamoto | |
| 2019/0118631 A1 | 4/2019 | Yamamoto et al. | |
| 2019/0299737 A1 * | 10/2019 | Sellars | B60G 3/225 |
| 2020/0039586 A1 | 2/2020 | Ayuzawa | |
| 2020/0223303 A1 | 7/2020 | Saeki | |
| 2020/0269922 A1 | 8/2020 | Kiyoshita et al. | |
| 2020/0307701 A1 | 10/2020 | Park et al. | |
| 2020/0324821 A1 | 10/2020 | Heo | |
| 2021/0188028 A1 | 6/2021 | Lou et al. | |
| 2021/0339617 A1 | 11/2021 | Ohkuma et al. | |
| 2022/0097511 A1 | 3/2022 | Wang et al. | |
| 2022/0176787 A1 | 6/2022 | Ostertag et al. | |
| 2022/0185125 A1 | 6/2022 | Gim et al. | |
| 2022/0185377 A1 | 6/2022 | Yong et al. | |
| 2022/0388580 A1 | 12/2022 | Li et al. | |
| 2023/0095674 A1 | 3/2023 | Inami et al. | |

FOREIGN PATENT DOCUMENTS

| | | |
|---|---|---|
| CN | 112046615 A | 12/2020 |
| EP | 0856455 A2 | 5/1998 |
| EP | 1084937 A2 | 3/2001 |
| JP | 6597761 B2 | 10/2019 |
| KR | 20150118809 A | 10/2015 |
| WO | 2005066012 A1 | 7/2005 |
| WO | 2018078989 A1 | 5/2018 |

* cited by examiner

\<A − A\>

\<B − B\>

VEHICLE BODY

CROSS-REFERENCE TO RELATED APPLICATIONS

This application claims the benefit of Korean Patent Application No. 10-2020-0172442, filed in the Korean Intellectual Property Office on Dec. 10, 2020, which application is hereby incorporated herein by reference.

TECHNICAL FIELD

The present invention relates to a vehicle body.

BACKGROUND

In general, a vehicle body must be designed to allow various components in the vehicle to be mounted thereon and, when a collision impact is applied to the vehicle, to efficiently absorb the collision impact and thus to protect passengers in the vehicle from the collision impact.

A conventional vehicle requires a space in which an engine or a battery is mounted and a space in which wheels, a suspension device, a steering device and the like for driving the vehicle are mounted. Accordingly, because wheel housings for accommodating the wheels, the suspension device provided at the wheels, the steering device connecting the wheels to each other, the drive device for supplying driving force and the like occupy a considerable amount of space, the vehicle body must be designed to provide sufficient space to accommodate the components and to absorb impacts applied to the vehicle. Furthermore, as the number of associated components increases, the process of manufacturing and assembling the vehicle is increasingly complicated, and the time required to perform the process is increased.

In recent years, an in-wheel system, in which a drive unit, a steering unit, a reduction gear and the like are mounted, has been developed. In the in-wheel system, because there is no need to connect the individual wheels to each other, the vehicle body must also be designed differently from a conventional vehicle. Accordingly, when a vehicle adopts the in-wheel system, there is a need to develop a vehicle body capable of providing space for wheel housings, ensuring sufficient rigidity of the vehicle body and simplifying a process of manufacturing and assembling the vehicle body.

The details described as the background art are intended merely for the purpose of promoting understanding of the background of the present invention, and should not be construed as an acknowledgment of the prior art that is previously known to those of ordinary skill in the art.

SUMMARY

The present invention relates to a vehicle body. Particular embodiments relate to a vehicle body of an in-wheel platform vehicle, in which side truss members, cross truss members, cross floor truss members and side connection truss members are coupled to one another so as to define the floor of the vehicle and the spaces for accommodating the wheels of the vehicle, and are connected to at least two shock absorber housings, which are positioned above the wheels, via support members.

Therefore, embodiments of the present invention can solve problems in the art, and an embodiment of the present invention provides a vehicle body of an in-wheel platform vehicle, in which side truss members, cross truss members, cross floor truss members and side connection truss members are coupled to one another so as to define the floor of the vehicle and the spaces for accommodating the wheels of the vehicle, and are connected to at least two shock absorber housings, which are positioned above the wheels, via support members.

Embodiments of the present invention provide a vehicle body including a pair of side truss members extending in the longitudinal direction of a vehicle, at least two cross truss members connecting the pair of side truss members to each other in the width direction of the vehicle, at least two cross floor truss members, which are coupled to upper ends of the pair of side truss members, extend in a transverse direction of the side truss members, and are spaced apart from each other in an anteroposterior direction, and side connection truss members, each of which extends in the longitudinal direction of the vehicle and connects ends of the at least two cross floor truss members to each other.

Each of the side truss members, the cross truss members, the cross floor truss members and the side connection truss members may be configured to extend in a longitudinal direction and to be closed at the ends or side walls thereof such that the side truss members, the cross truss members, the cross floor truss members and the side connection truss members are coupled to one another in a state of surface contact between the closed surfaces thereof.

Each of the side truss members, the cross truss members, the cross floor truss members and the side connection truss members may be configured to have therein an internal space and to extend in a longitudinal direction and may be open at one surface thereof such that the side truss members, the cross truss members, the cross floor truss members and the side connection truss members are coupled to one another using a tool introduced into the internal space.

Each of the cross truss members may be coupled at one end thereof to a side wall of one of the side truss members and at a remaining end thereof to a side wall of a remaining one of the side truss members so as to support the pair of side truss members at a position between the pair of side truss members.

Each of the cross floor truss members may be coupled at two ends thereof to upper surfaces of the side truss members, or may extend outwards beyond the side truss members, and may be coupled to the upper surfaces of the side truss members at a plurality of points between the two ends thereof.

When each of the cross floor truss members extends outwards beyond the side truss members, the ends of the cross floor truss members may be coupled to upper surfaces of the side connection truss members.

Each of the side truss members may be longer than a corresponding side connection truss member such that wheels of the vehicle are positioned in spaces defined between ends of the side truss member and ends of the side connection truss member.

The vehicle body may further include at least two shock absorber housings, which support upper ends of shock absorbers connected to wheels of the vehicle while covering the shock absorbers, and each of the shock absorber housings may be provided at a lower end thereof with a support member, and may be supported by the at least two cross floor truss members via the support member.

A lower end of the support member may be coupled to upper surfaces of the cross floor truss members at one of ends of the cross floor truss members or at a point at which one of the cross floor truss members is coupled to a corresponding one of the side truss members or a corresponding one of the side connection truss members.

The support member may be coupled at upper ends thereof to corners of the shock absorber housing that face an inside of the vehicle, among four corners of the shock absorber housing, and the support member may extend downwards while being inclined in an outward direction of the shock absorber housing at a predetermined slope and may be coupled at a lower end thereof to upper surfaces of the cross floor truss members.

Front or rear ends of the pair of side truss members may be provided with a front or rear lower truss member connected thereto, the front or rear lower truss member being bent in outward and upward directions of the side truss members and being coupled to lower ends of two shock absorber housings.

Two lateral sides of the at least two cross floor truss members may be respectively provided with lateral lower truss members, each of which connects ends of the at least two cross floor truss members to each other, each of the lateral lower truss members being bent in outward and upward directions of the at least two cross floor truss members, being coupled to the side connection truss members and the support members, and being coupled at a lower end thereof to lower ends of the two shock absorber housings positioned at front and rear sides of the vehicle.

The length of the cross truss members or the cross floor truss members may vary according to the overall width of the vehicle, and the length of the side truss members or the side connection truss members may vary according to the overall length of the vehicle.

The side truss members, the cross truss members, the cross floor truss members and the side connection truss members may be coupled to one another through bolting.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
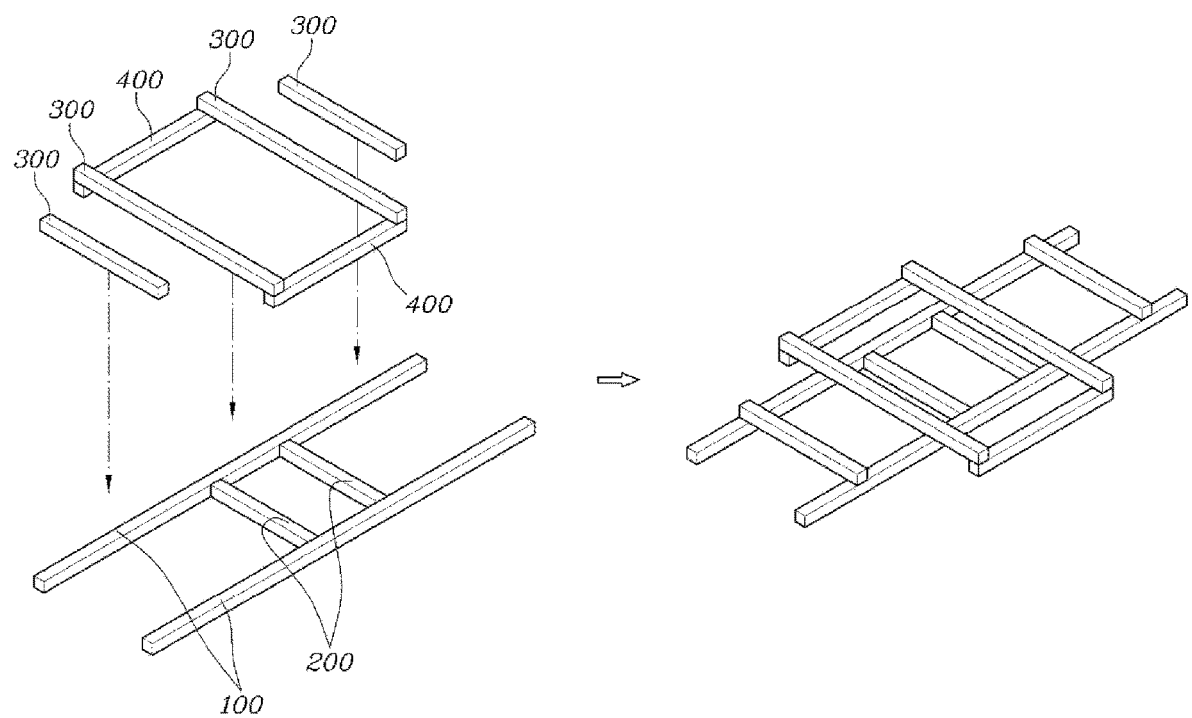
FIG. 1 is a view illustrating the vehicle body according to an embodiment of the present invention in the state in which various members thereof are coupled to one another.
Figure 2:
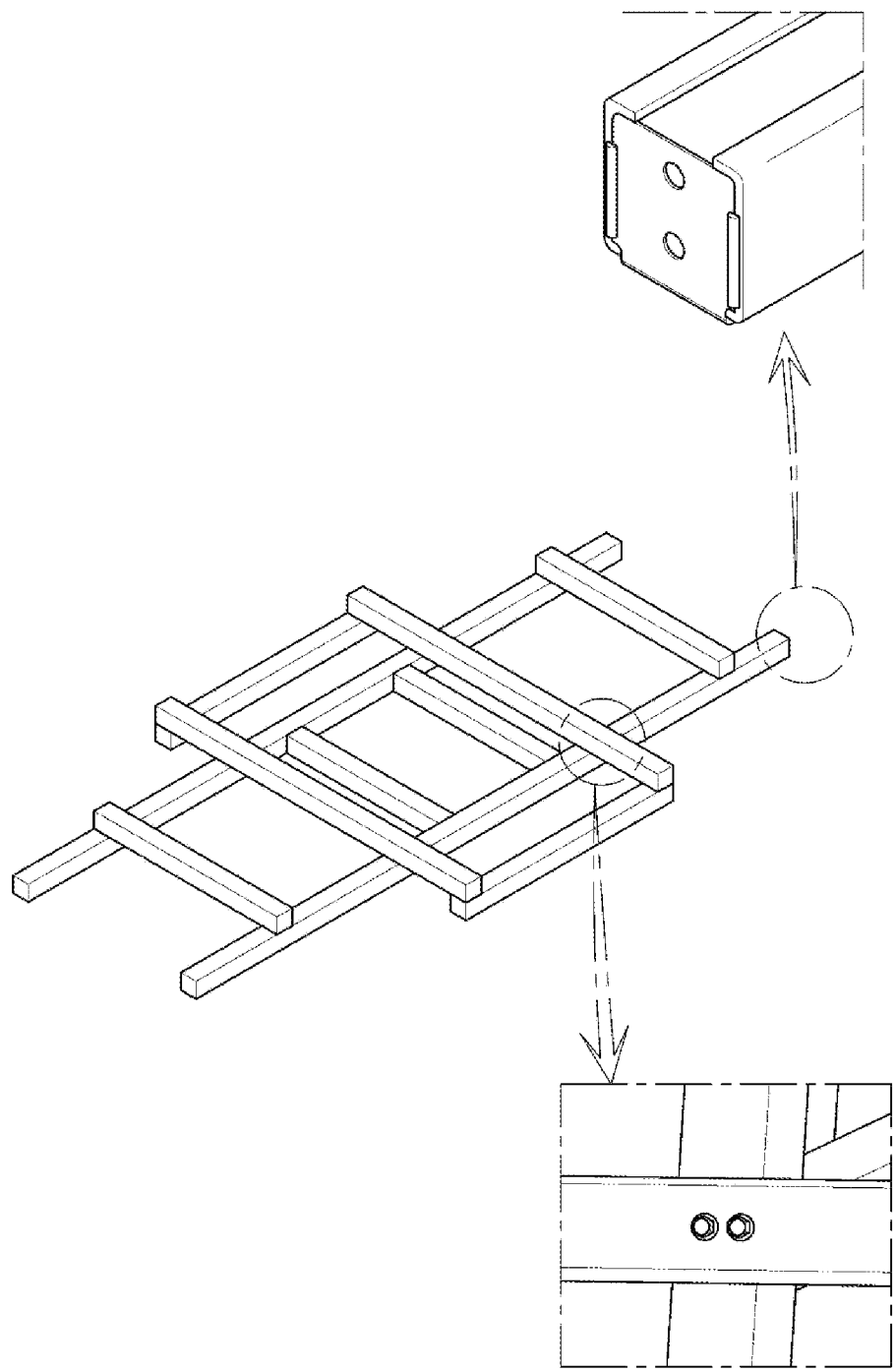
FIG. 2 is a view illustrating the ends of the members of the vehicle body according to an embodiment of the present invention and portions at which the members are coupled to each other.
Figure 3A:
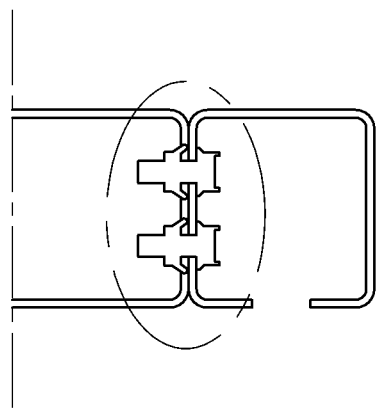
FIGS. 3A and 3B are views illustrating the state in which the members of the vehicle body according to an embodiment of the present invention are coupled to each other through open surfaces thereof.
Figure 3B:
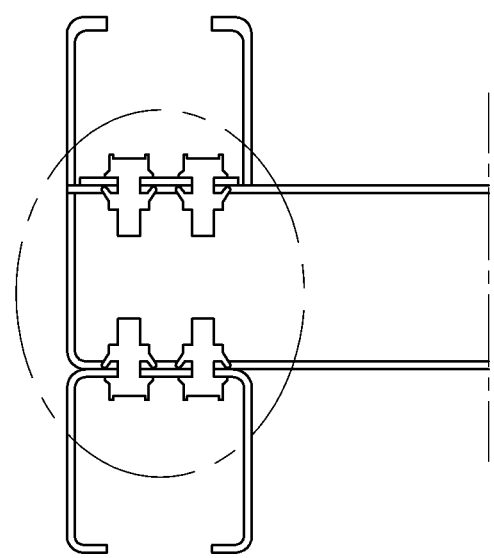
Figure 4:
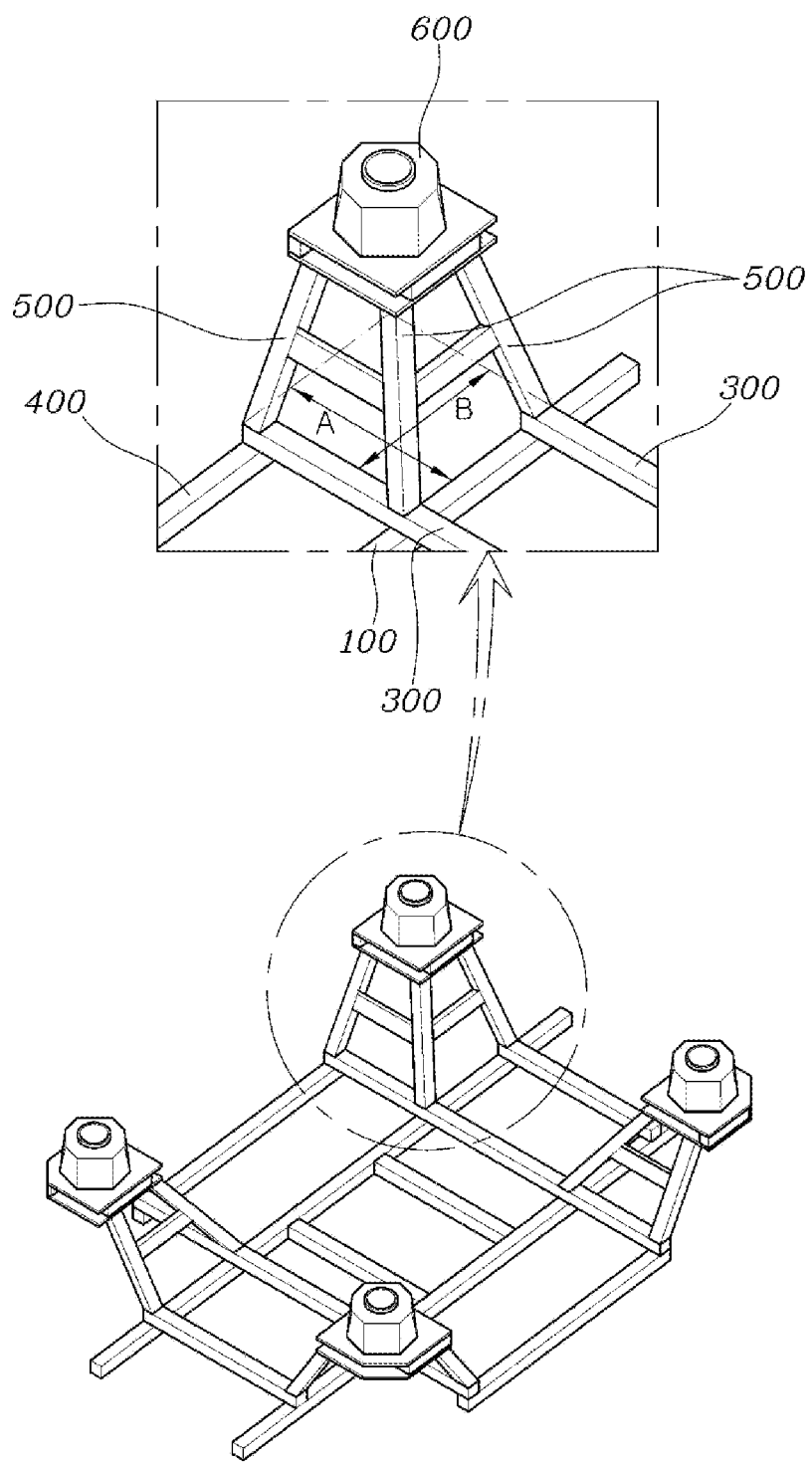
FIG. 4 is a view illustrating the vehicle body according to an embodiment of the present invention in the state in which the members are coupled to shock absorber housings.
Figure 5:
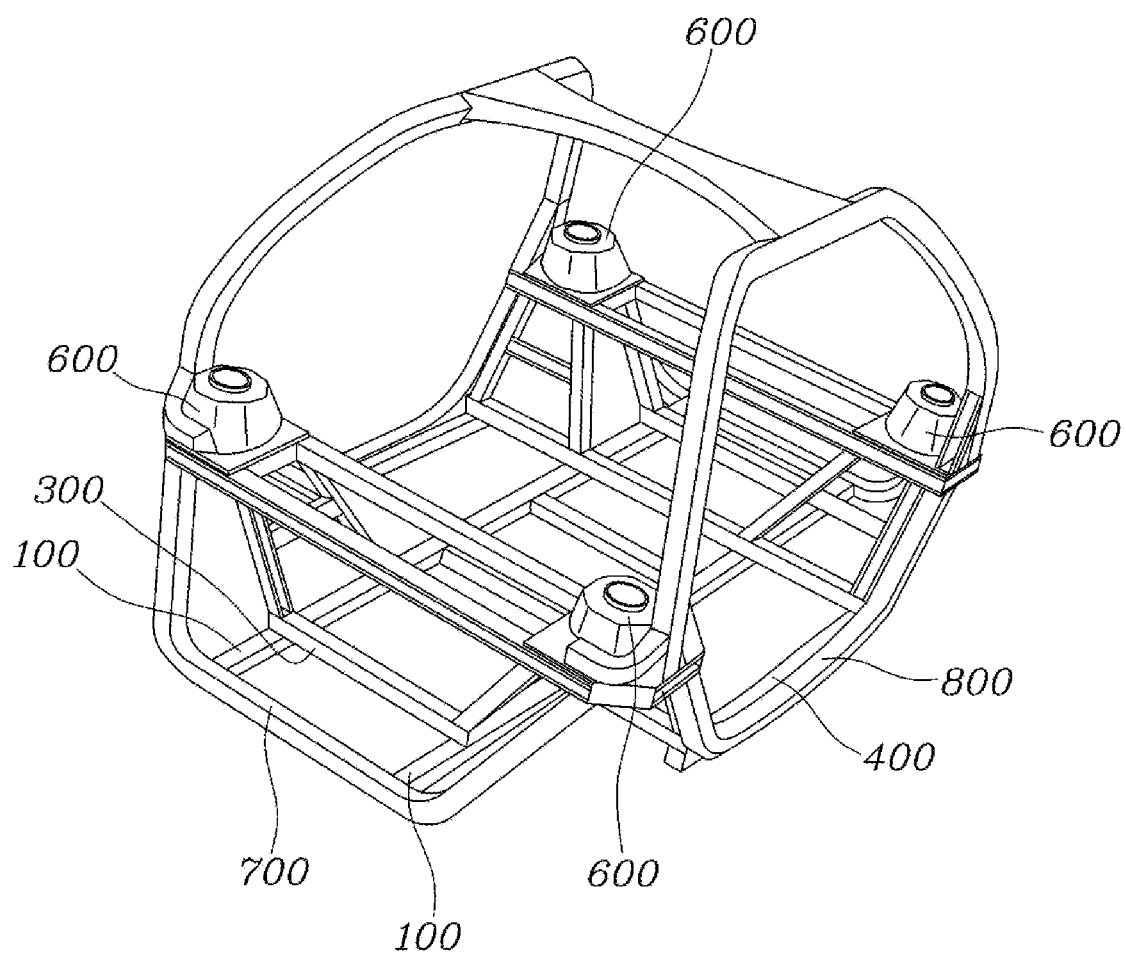
FIG. 5 is a view illustrating the finished vehicle body according to an embodiment of the present invention in the state in which the members are completely coupled to each other.

FIG. 1 is a view illustrating the vehicle body according to an embodiment of the present invention in the state in which various members thereof are coupled to one another. FIG. 2 is a view illustrating the ends of the members of the vehicle body according to an embodiment of the present invention and portions at which the members are coupled to each other. FIGS. 3A and 3B are views illustrating the state in which the members of the vehicle body according to an embodiment of the present invention are coupled to each other through open surfaces thereof. FIG. 4 is a view illustrating the vehicle body according to an embodiment of the present invention in the state in which the members are coupled to shock absorber housings. FIG. 5 is a view illustrating the finished vehicle body according to an embodiment of the present invention in the state in which the members are completely coupled to each other.

The vehicle body according to an embodiment of the present invention includes a pair of side truss members 100 extending in the longitudinal direction of the vehicle, at least two cross truss members 200 connecting the pair of side truss members 100 to each other in the width direction of the vehicle, at least two cross floor truss members 300, which are coupled to the upper ends of the pair of side truss members 100, extend in the transverse direction of the side truss members 100, and are spaced apart from each other in an anteroposterior direction, and side connection truss members 400, each of which extends in the longitudinal direction of the vehicle and connects the ends of the at least two cross floor truss members 300 to each other.

Unlike conventional vehicles, the vehicle body according to an embodiment of the present invention is intended to be applied to a vehicle adopting an in-wheel system, and does not require a drive shaft or a steering device to be connected to the wheels. Accordingly, each of the wheels of the vehicle is provided at the upper end thereof with a shock absorber and a shock absorber housing, whereby the shock absorber housing protects the wheel of the vehicle and the shock absorber positioned above the wheel. The various members 100, 200, 300 and 400 are coupled to one another so as to define the floor of the vehicle. Each side of the floor is coupled to the shock absorber housing via a support member so as to increase the coupling rigidity between the floor and the shock absorber housing and to ensure a required rigidity of the vehicle and appropriate load dispersion in the event of a collision of the vehicle.

Specifically, the pair of side truss members 100 are disposed in the longitudinal direction of the vehicle so as to increase the collision rigidity in the event of a collision at a front end or a rear end of the vehicle. The at least two cross truss members 200 are disposed between the pair of side truss members 100 and are connected thereto so as to support the pair of side truss members 100 and to disperse impact and increase lateral rigidity of the vehicle in the event of a lateral collision. The at least two cross floor members 300 are disposed on the upper ends of the side truss members 100 across the side truss members 100, and are coupled to thereto so as to disperse impact and to increase the lateral rigidity of the vehicle in the event of a lateral collision. Furthermore, the side connection truss members 400 are also disposed between the cross floor truss members 300 and are coupled thereto so as to increase the rigidity of the vehicle in the event of a front or rear collision. As a result, since the various members are coupled to one another so as to define the floor of the vehicle, it is possible to support the load of the vehicle, efficiently absorb the impact applied to the vehicle, and ensure the collision rigidity of the vehicle.

Each of the side truss members 100, the cross truss members 200, the cross floor truss members 300 and the side connection truss members 400 may be configured to extend in a longitudinal direction, and may be closed at the ends or side walls thereof. Hence, the various members may be coupled to one another in the state of surface contact between the closed surfaces thereof. Alternatively, each of the side truss members 100, the cross truss members 200, the cross floor truss members 300 and the side connection truss members 400 may be configured to have therein the internal space and to extend in a longitudinal direction, and may be open at one surface thereof. Hence, the various members may be coupled to one another using a tool introduced into the internal space.

Specifically, each of the side truss members 100, the cross truss members 200 and the side connection truss members 400 may be configured to have an open cross-section at one surface thereof such that the members may be held in surface contact with and coupled to one another by bolting or the like using a tool introduced through the open surface. Meanwhile, the cross floor truss members 300 serve to support the lateral load of the vehicle. Here, because the lateral side of the vehicle has relatively little space to absorb impact compared to the front or rear portion of the vehicle, each of the cross floor truss members 300 may be configured to have a closed cross-section rather than an open cross-section so as to increase collision rigidity. Since each of the various members is configured to have a closed surface at the ends thereof so as to increase the rigidity of the member and to be easily held in surface contact with and coupled to another member through bolting or the like, it is possible to ensure sufficient coupling rigidity. As a result, it is possible to ensure sufficient coupling rigidity between the members while maintaining the rigidity of the vehicle itself when the members are coupled to one another and to allow a human or a robot to easily and conveniently assemble the members in an assembly process.

Each of the cross truss members 200 may be coupled at one end thereof to a side wall of one of the side truss members 100 and at the other end thereof to a side wall of the other of the side truss members 100 so as to support the two side truss members 100 at a position between the two side truss members 100. Referring to FIGS. 3A and 3B, each of the cross truss members 200 is coupled to the two side truss members 100 in the manner shown in FIG. 3A so as to connect the two side truss members 100 to each other, thereby distributing the load to the two side truss members 100 and increasing the rigidity in the event of a lateral collision.

Each of the cross floor truss members 300 may be coupled at the ends thereof to the upper surfaces of the side truss members 100, or may extend beyond the side truss members 100 and may be coupled to the upper surfaces of the side truss members 100 at a plurality of points between the two ends thereof. When each of the cross floor truss members 300 extends outwards beyond the side truss members 100, the ends of the cross floor truss member 300 may be coupled to the upper surfaces of the side connection truss members 400. Each of the side truss members 100 is longer than the side connection truss member 400, and vehicular wheels may be positioned in the spaces defined between the ends of the side truss member 100 and the ends of the side connection truss member 400.

Specifically, since the cross floor truss members 300 are disposed on the upper surfaces of the side truss members 100, it is possible to increase the coupling rigidity between the members and the collision rigidity and to disperse the load. Particularly, because the cross floor truss members 300, which are positioned at the front and rear side of the vehicle, are shorter and the intermediate cross floor truss member is longer, a space for accommodating therein a vehicular wheel or a wheel housing of a vehicle having an in-wheel system is defined between the shorter cross floor truss members 300 and the longer intermediate cross floor truss member 300. The space must be sufficiently large to allow the wheel of an in-wheel system to be rotated 360 degrees.

Referring to FIG. 3B, when the cross floor truss member 300 extends outward beyond the side truss members 100 and is coupled to open surfaces of the side truss members 100 at a plurality of points between the two ends thereof, the members may be coupled to each other in the manner shown in FIG. 3B. Here, the upper surface of the coupling portion of the cross floor truss member 300 may be coupled to a support member, which supports a shock absorber housing and has an open cross-section, in the manner shown in FIG. 3B.

FIG. 4 is a view illustrating the vehicle body according to an embodiment of the present invention in which the members are coupled to shock absorber housings. The vehicle body according to an embodiment of the present invention further includes at least two shock absorber housings 600, which support the upper ends of shock absorbers connected to the vehicular wheels while covering the shock absorbers. Each of the shock absorber housings 600 may be provided at the lower end thereof with a support member 500, and may be supported by at least two cross floor truss members 300 via the support member 500. The lower end of the support member 500 may be coupled to one of the upper surfaces of the cross floor truss members 300 at one of the ends of the cross floor truss members 300 or at a point at which the cross floor truss member 300 is coupled to the side truss member 100 or the side connection truss member 400.

Specifically, the support member 500 may be coupled at the upper ends thereof to the corners of the shock absorber housing 600 that face the inside of the vehicle, among the four corners of the shock absorber housing 600. The support member 500 may extend downward while being inclined in the outward direction of the shock absorber housing 600 at a predetermined slope, and may be coupled at the lower end thereof to the upper surfaces of the cross floor truss members 300. Since the support member 500 ensures the maximum space between the cross floor truss members 300 and supports the shock absorber housing 600 at the upper ends thereof, a wheel of an in-wheel system vehicle is capable of being normally rotated and moved under the shock absorber housing 600. In order for the support member 500 to stably support the shock absorber housing 600, it is preferable that the at least two cross floor truss members 300 be positioned in the same plane. Furthermore, by standardizing or changing a transverse or longitudinal length (A or B) of the space defined by the at least two cross floor truss members 300, it is possible to easily manufacture a vehicle body even when the same wheel is used in different kinds of vehicles, and to easily manufacture various kinds of vehicles having various designs.

FIG. 5 is a view illustrating the finished vehicle body according to an embodiment of the present invention in which the members are completely coupled to each other. The front or rear ends of the pair of side truss members 100 are provided with a front or rear lower truss member 700 connected thereto. The front or rear lower truss member 700 may be bent in outward and upward directions of the side truss members 100, and may be coupled to the lower ends of two shock absorber housings 600. By virtue of the front or rear lower truss member 700, it is possible to increase the coupling rigidity between the side truss members 100 and the shock absorber housings 600, increase the collision rigidity of the vehicle in the event of a front, rear or lateral collision, and disperse impacts to the various members.

The two lateral sides of the at least two cross floor truss members 300 may be respectively provided with lateral lower truss members 800, each of which connects the ends of the at least two cross floor truss members 300 to each other. Each of the lateral lower truss members 800 may be bent in outward and upward directions of the at least two cross floor truss members 300, and may be coupled to the side connection truss members 400 and the support members 500. Each of the lateral lower truss members 800 may be coupled at the lower ends thereof to the lower ends of the front and rear shock absorber housings 600. By virtue of the lateral lower truss members 800, it is possible to increase the coupling rigidity between the at least two cross floor truss members 300, the side connection truss members 400, the support members 500 and the shock absorber housing 600, increase the collision rigidity of the vehicle in the event of a front, rear or lateral collision, and disperse the impact to the various members.

The length of the cross truss members 200 or the cross floor truss members 300 may vary according to the overall width of the vehicle, and the length of the side truss members 100 or the side connection truss members 400 may vary according to the overall length of the vehicle. Accordingly, the vehicle body according to an embodiment of the present invention is applicable to vehicles including various platforms by changing the lengths or shapes of the various members, making it possible to easily and conveniently manufacture or assemble vehicles having various designs.

Furthermore, the side truss members 100, the cross truss members 200, the cross floor truss members 300 and the side connection truss members 400 may be coupled to one another through bolting. Accordingly, since the individual members are constructed to have the same shape rather than to have respective shapes and are assembled with one another, there is an advantage in terms of assembly and productivity of a vehicle. In addition, because the various members are assembled with one another in a convenient way such as bolting through the open cross-section or closed cross-section of the members, it is possible to quickly assemble or manufacture vehicles having various shapes in a short period of time.

As is apparent from the above description, in the in-wheel platform vehicle according embodiments of to the present invention, the side truss members, the cross truss members, the cross floor truss members and the side connection truss members are coupled to one another so as to define the floor of the vehicle and spaces for accommodating the wheels of the vehicle, and are connected to at least two shock absorber housings, which are positioned above the wheels, via the support members.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle body comprising:
    a pair of side truss members extending in a longitudinal direction of a vehicle;
    a plurality of cross truss members connecting the pair of side truss members to each other in a width direction of the vehicle;
    a plurality of cross floor truss members coupled to upper ends of the pair of side truss members, extending in a transverse direction of the side truss members, and spaced apart from each other in an anteroposterior direction; and
    a plurality of side connection truss members extending in the longitudinal direction of the vehicle and connecting ends of the cross floor truss members to each other,
    wherein each of the side truss members, the cross truss members, the cross floor truss members and the side connection truss members includes an internal space therein, extends in a longitudinal direction, and is open at one surface thereof such that the side truss members, the cross truss members, the cross floor truss members and the side connection truss members are configured to be coupled to one another using a tool introduced into the internal space.

2. The vehicle body according to claim 1, wherein each of the side truss members, the cross truss members, the cross floor truss members and the side connection truss members extends in a longitudinal direction and is closed at ends or side walls thereof such that the side truss members, the cross truss members, the cross floor truss members and the side connection truss members are coupled to one another in a state of surface contact between the closed ends or side walls.

3. The vehicle body according to claim 1, wherein each of the cross truss members is coupled at a first end to a side wall of a first of the side truss members and at a second end to a side wall of a second of the side truss members to support the pair of side truss members at a position between the pair of side truss members.

4. The vehicle body according to claim 1, wherein each of the cross floor truss members is coupled at two ends thereof to upper surfaces of the side truss members, or wherein each of the cross floor truss members extends outward beyond the side truss members and is coupled to the upper surfaces of the side truss members at a plurality of points between the two ends thereof.

5. The vehicle body according to claim 4, wherein, when each of the cross floor truss members extends outward beyond the side truss members, the ends of the cross floor truss member are coupled to upper surfaces of the side connection truss members.

6. The vehicle body according to claim 1, wherein each of the side truss members is longer than the side connection truss member such that wheels of the vehicle are configured to be positioned in spaces defined between ends of the side truss member and ends of the side connection truss member.

7. The vehicle body according to claim 1, wherein a length of the cross truss members or the cross floor truss members varies according to an overall width of the vehicle and a length of the side truss members or the side connection truss members varies according to an overall length of the vehicle.

8. The vehicle body according to claim 1, wherein the side truss members, the cross truss members, the cross floor truss members and the side connection truss members are coupled to one another through bolting.

9. A vehicle body comprising:
    a pair of side truss members extending in a longitudinal direction of a vehicle;

a plurality of cross truss members connecting the pair of side truss members to each other in a width direction of the vehicle;

a plurality of cross floor truss members coupled to upper ends of the pair of side truss members, extending in a transverse direction of the side truss members, and spaced apart from each other in an anteroposterior direction;

a plurality of side connection truss members extending in the longitudinal direction of the vehicle and connecting ends of the cross floor truss members to each other; and a plurality of shock absorber housings configured to support upper ends of shock absorbers connected to wheels of the vehicle while covering the shock absorbers, wherein each of the shock absorber housings includes a support member at a lower end thereof and is configured to be supported by the cross floor truss members via the support member, wherein two lateral sides of the cross floor truss members are respectively provided with lateral lower truss members, each of the lateral lower truss members connecting ends of the cross floor truss members to each other, being bent in outward and upward directions of the cross floor truss members, being coupled to the side connection truss members and the support members, and being coupled at a lower end thereof to lower ends of two of the shock absorber housings positioned at front and rear sides of the vehicle.

10. The vehicle body according to claim 9, wherein a lower end of the support member is coupled to an upper surface of the cross floor truss member at an end of the cross floor truss member or at a point where the cross floor truss member is coupled to a corresponding one of the side truss members or a corresponding one of the side connection truss members.

11. The vehicle body according to claim 9, wherein:
upper ends of the support member are coupled to corners of the shock absorber housing that face an inside of the vehicle, among four corners of the shock absorber housing; and
the support member extends downward while being inclined in an outward direction of the shock absorber housing at a predetermined slope, and a lower end of the support member is coupled to upper surfaces of the cross floor truss members.

12. The vehicle body according to claim 9, wherein front or rear ends of the pair of side truss members are provided with a front or rear lower truss member connected thereto, the front or rear lower truss member being bent in outward and upward directions of the side truss members and being coupled to lower ends of two of the shock absorber housings.

13. A vehicle comprising:
a vehicle body;
a pair of side truss members extending in a longitudinal direction of the vehicle and coupled to the vehicle body;
a plurality of cross truss members connecting the pair of side truss members to each other in a width direction of the vehicle;

a plurality of cross floor truss members coupled to upper ends of the pair of side truss members, extending in a transverse direction of the side truss members, and spaced apart from each other in an anteroposterior direction;

a plurality of side connection truss members extending in the longitudinal direction of the vehicle and connecting ends of the cross floor truss members to each other;

a plurality of shock absorbers;

a plurality of shock absorber housings, each shock absorber housing supporting an upper end of a respective shock absorber and covering the respective shock absorbers and wheels connected to the shock absorbers;

wherein each of the side truss members, the cross truss members, the cross floor truss members and the side connection truss members includes an internal space therein, extends in a longitudinal direction, and is open at one surface thereof such that the side truss members, the cross truss members, the cross floor truss members and the side connection truss members are configured to be coupled to one another using a tool introduced into the internal space.

14. The vehicle according to claim 13, wherein each of the side truss members, the cross truss members, the cross floor truss members and the side connection truss members extends in a longitudinal direction and is closed at ends or side walls thereof such that the side truss members, the cross truss members, the cross floor truss members and the side connection truss members are coupled to one another in a state of surface contact between the closed ends or side walls.

15. The vehicle according to claim 13, wherein each of the cross truss members is coupled at a first end to a side wall of a first of the side truss members and at a second end to a side wall of a second of the side truss members to support the pair of side truss members at a position between the pair of side truss members.

16. The vehicle according to claim 13, wherein each of the side truss members is longer than the side connection truss member such that the wheels of the vehicle are positioned in spaces defined between ends of the side truss member and ends of the side connection truss member.

17. The vehicle according to claim 13, wherein the side truss members, the cross truss members, the cross floor truss members and the side connection truss members are coupled to one another through bolting.

18. The vehicle body according to claim 2, wherein the side truss members, the cross truss members, the cross floor truss members and the side connection truss members are coupled to one another through bolting.

19. The vehicle body according to claim 3, wherein the side truss members, the cross truss members, the cross floor truss members and the side connection truss members are coupled to one another through bolting.

20. The vehicle body according to claim 4, wherein the side truss members, the cross truss members, the cross floor truss members and the side connection truss members are coupled to one another through bolting.

* * * * *